(12) United States Patent
Blytas et al.

(10) Patent No.: US 7,033,504 B1
(45) Date of Patent: Apr. 25, 2006

(54) METHOD FOR RECOVERING WATER SOLUBLE SURFACTANTS

(75) Inventors: George Constantine Blytas, Houston, TX (US); Vitold Raimond Kruka, Houston, TX (US)

(73) Assignee: Shell Oil Company, Houston, TX (US)

( * ) Notice: Subject to any disclaimer, the term of this patent is extended or adjusted under 35 U.S.C. 154(b) by 745 days.

(21) Appl. No.: 10/130,855

(22) PCT Filed: Nov. 21, 2000

(86) PCT No.: PCT/US00/32102

§ 371 (c)(1),
(2), (4) Date: May 21, 2002

(87) PCT Pub. No.: WO01/38695

PCT Pub. Date: May 31, 2001

Related U.S. Application Data

(60) Provisional application No. 60/167,283, filed on Nov. 29, 1999.

(51) Int. Cl.
*B01D 11/04* (2006.01)

(52) U.S. Cl. .................. 210/639; 166/267; 166/305.1; 210/634; 210/708; 210/747

(58) Field of Classification Search ................ 210/634, 210/639, 698–700, 747, 708; 137/13; 166/305.1, 166/310, 311, 267; 507/90; 585/15; 208/188
See application file for complete search history.

(56) References Cited

U.S. PATENT DOCUMENTS

| | | | | |
|---|---|---|---|---|
| 4,029,570 A | * | 6/1977 | Coffman et al. | 208/188 |
| 4,216,079 A | * | 8/1980 | Newcombe | 208/188 |
| 4,494,604 A | * | 1/1985 | Shaw et al. | 166/270.1 |
| 5,460,728 A | * | 10/1995 | Klomp et al. | 210/698 |
| 5,632,336 A | | 5/1997 | Notz et al. | |
| 5,648,575 A | * | 7/1997 | Klomp et al. | 585/15 |
| 5,877,361 A | * | 3/1999 | Rojey et al. | 585/15 |
| 5,879,561 A | * | 3/1999 | Klomp et al. | 210/698 |
| 6,093,862 A | * | 7/2000 | Sinquin et al. | 585/15 |

FOREIGN PATENT DOCUMENTS

| | | |
|---|---|---|
| FR | 0 442 767 A1 | 1/1991 |
| WO | 93/25798 | 12/1993 |
| WO | 95 17579 | 6/1995 |
| WO | 96 34177 | 10/1996 |

* cited by examiner

*Primary Examiner*—Joseph Drodge
(74) *Attorney, Agent, or Firm*—William E. Hickman

(57) ABSTRACT

Disclosed is a method for recovering and re-employing ionic surfactants from solutions, dispersions and emulsions of water and liquid hydrocarbons, by the addition of a second non-aqueous polar phase and an inorganic salt which changes the ionic strength of the surfactant and causes the surfactant to partition principally into the non-aqueous second polar phase. More specifically, the method applies to recovering hydrate growth inhibitor/modifying compounds, with cationic surfactants such as ammonium, phosphonium and sulphonium alkylated compounds from the effluent of hydrocarbon production wells; the effluent including water, hydrate inhibitor compound, at least one additional polar solvent and inorganic salt. Sufficient additional ions of inorganic salt, and if necessary, an alcohol/glycol are added to the effluent to form a second polar phase that is less polar than the aqueous phase, into which the hydrate inhibitor can then dissolve and be separated from the effluent.

30 Claims, 1 Drawing Sheet

METHOD FOR RECOVERING WATER SOLUBLE SURFACTANTS

This application is a 371 of PCT/US00/32102, filed Nov. 21, 2000, and claims the benefit of provisional application 60/167,283 filed Nov. 29, 1999.

CROSS REFERENCE

This application is related to U.S. Pat. No. 5,460,728, U.S. Pat. No. 5,648,575, and U.S. Pat. No. 5,879,561.

FIELD OF INVENTION

This invention relates to the recovery of water soluble surfactants from low concentration water solutions. Specifically, this invention relates to a certain class of hydrate inhibition compounds used to inhibit the plugging by gas hydrates of conduits containing a mixture of low-boiling hydrocarbons and water. More particularly, this invention relates to a method for recovering and re-employing hydrate inhibition compounds from the aqueous fluids produced from crude oil and natural gas wells.

BACKGROUND OF THE INVENTION

Surface active compounds, or surfactants, are employed in a variety of processes for the purpose of reducing surface tension and distributing immiscible phases or compounds amongst each other as, for example, emulsions or dispersions, or for separating phases from distributed systems. The various surfactants used include a class of surface active compounds which can be employed to distribute clathrate hydrates of natural gases (hereinafter referred to as gas hydrates) throughout produced well fluids in order to prevent the plugging of pipelines and other conduits by these hydrates. The chemical, physical, and thermodynamic properties of these hydrates are described in detail in E. D. Sloan's book "Clathrate Hydrates of Natural Gases", Marcel Dekker, NY, 1998.

Low boiling hydrocarbons, such a methane, ethane, propane, and isobutane, as well as carbon dioxide and hydrogen sulfide are present in the fluids produced from natural gas and crude oil recovery wells and are capable of forming gas hydrates with water which is also typically present in the fluids produced from natural gas and crude oil recovery wells. The mixture of water and the described well fluid components will form hydrates at the right conditions of high pressure and low temperature. For practical purposes gas hydrates are found particularly in deep sea hydrocarbon producing wells where low temperatures and high pressures are common. The hydrates have a tendency to occlude or block these pipelines or conduits. The fluid produced from a recovery well is often under conditions of high pressure and low temperature, especially when there is no flow, such as when the well is shut-in. Shut-in pressures may range up to 90 MPa. In deep subsea wells the produced stream is quickly cooled to the subsea temperature which may be as low as (−)1 degree Celsius, is usually around 4 degrees Celsius, and may be above that temperature. Under these conditions gas hydrate crystals can form within the fluids produced from natural gas and crude oil wells and may grow and form deposits within the wellbores of the crude oil or natural gas wells and within the conduits, such as pipelines and other facilities, downstream of the wells. The deposits restrict the flow area and thus the flow rate. In addition, the deposits can break off locally. The broken piece or pieces travel down the flowline and act as a scraper or plow, collecting other deposits. This process leads to an increasing collection of hydrates, which can grow large enough to block or damage the wellbores and other conduits. The problem is especially severe in crude oil and natural gas wells located in places such as the deepwater Gulf of Mexico, where the amount of subcooling typically can reach between 3° Celsius and 30° Celsius. As used herein, the term "subcooling" denotes the difference between the temperature at which the hydrates would decompose at the prevailing pressures, and the environmental temperatures actually present in the wellbore or conduit, if less than the decomposition temperature.

Several methods can be utilized to prevent the blocking of conduits. For example, the conduits may be insulated in an effort to maintain an elevated temperature within the conduit, a temperature above the hydrate formation temperature. This method works while there is flow in the conduit but does not protect against cooling during extended shut-ins caused by storms or other operational needs. Further, insulation is expensive and is difficult to incorporate once a pipeline or other conduit has been built and installed. This is especially true for deepwater crude oil and natural gas wells, where the conduit may be installed under several thousand feet of water.

The shut-in problem can be resolved by heat tracing the conduit either electrically or with a conduit flowing a heated fluid. However, heat tracing further raises the expense of constructing and operating the system.

Melting point depressants (antifreezes), such as the lower alcohols, glycols, and inorganic salts can be used in an attempt to prevent the formation of hydrates. However, at the high subcooling experienced in deep waters, the antifreezes need to be added in substantial amounts, up to quantity equal to the amount of produced water, to be effective.

The use of crystal growth inhibitors or modifiers, as described in U.S. Pat. Nos. 5,460,728, 5,648,575, and 5,879,561, can be utilized to inhibit the formation and/or agglomeration of hydrate crystals. The products used for control of hydrates in the cited patents are ammonium, phosphonium, or sulphonium alkylated compounds, including quaternary compounds. These products are surfactant in that they incorporate parts which are very water soluble (4 to 5 carbon alkyls attached to a charged nitrogen, phosphorous, or sulfur), and parts which prefer to be surrounded by liquid hydrocarbons (at least 8 carbon organic moieties). Overall these compounds, with no more than two 8+ carbon organic moieties, are preferably water soluble, but may also partition into the hydrocarbon phase.

It would be economically advantageous if it were possible to recycle these compounds as a means of alleviating production and disposal costs. U.S. Pat. No. 5,648,575 discloses a method of neutralizing the protonated compound with a base at the end of the conduit or pipeline and recovering the neutralized compound. However, this method results in the breakdown of the surfactant inhibitor compound so as to make recovery of the original compound impossible. In the method of The present invention the compound is recovered intact and ready to be reused over and over again.

The present invention makes the use of This type of hydrate inhibitor/modifier compounds more economical. Finally, by making it possible to recover and reuse the hydrate growth inhibitor/modifier compounds in process fluids, the invention also reduces the costs associated with disposal.

SUMMARY

It has now been discovered that hydrate growth inhibitor compounds comprising cationic surfactants or polymeric surfactants, such as, for example, ammonium, phosphonium, and sulphonium alkylated quaternary or ternary compounds, singly or attached to polymeric compounds can be recovered from the process fluids of a hydrocarbon production well, the process fluids comprising a mixture of low and high boiling hydrocarbons, other gases, water, hydrate inhibitor compound, at least one additional polar solvent, and inorganic salt, by a method comprising adding sufficient additional ions from an inorganic salt and, if necessary, an alcohol, such as, for example, isopropanol or sec-butanol, to form a second phase, less polar than the aqueous phase, into which second phase the cationic surfactant partitions and can then be separated from the brine and liquid hydrocarbon phase.

The present invention further comprises a means of recovering ionic surfactants or polymeric surfactants from aqueous solutions or liquid water/liquid hydrocarbon dispersions or emulsions by providing a second miscible, partially miscible, or immiscible polar solvent which is not liquid hydrocarbon miscible and adjusting the ionic strength of the solvents by addition of inorganic salts sufficient to cause the formation of two phases of differing polarity, in a manner which causes the ionic surfactant to partition into the less polar of the two phases, while the inorganic salt partitions into the more polar aqueous phase.

DETAILED DESCRIPTION OF THE INVENTION

Figure 1:
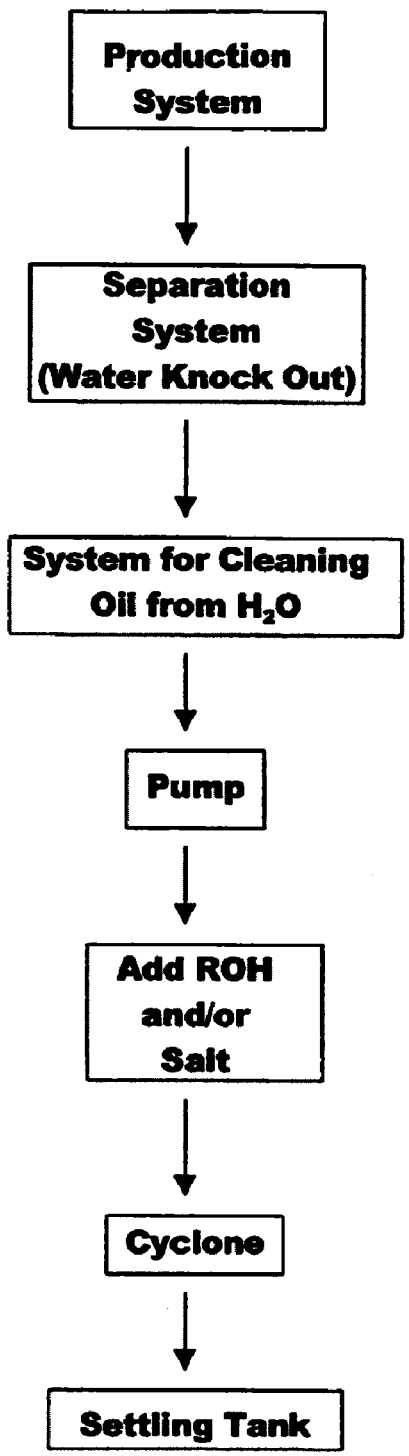
FIG. 1 shows a block flow chart of a production/separation system as well as a preferred point of implementation of the invention.

The present invention is a method to recover ionic surfactants or polymeric surfactants from aqueous solutions, or water-in-oil dispersions or emulsions. More specifically, the present invention is a method for the recovery of hydrate growth inhibitors or modifiers, such as cationic surfactants or polymeric surfactants, employed to inhibit the plugging by gas hydrates of conduits containing low-boiling hydrocarbons, other gases, and water. The cationic surfactants are generally present in an amount between 0.05 and 5 wt %, preferably between 0.1 and 1.0 wt %, based on the amount of water in the hydrocarbon-containing mixture.

Hydrate growth inhibitor compounds that would be within the scope of the present invention are generally cationic surfactants, including long chain fatty amines and quaternary ammonium, phosphonium, or ternary sulphonium salts. The preferred compounds are described in U.S. Pat. Nos. 5,460,728, 5,648,575, and 5,879,561, all incorporated by reference herein in the entirety, as well as such compounds bound to polymers. They are alkylated ammonium, phosphonium, and sulphonium compounds. The preferred compounds for the present invention can be represented by:

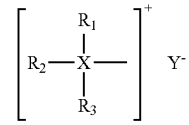

Wherein X is chosen from S, N—$R_4$, P—$R_4$; where S, N, and P are sulfur, nitrogen, and phosphorous, respectively. The plus and minus signs denote cations and anions, respectively;

Wherein Y is chosen from bromide, chloride, iodide, fluoride;

Wherein no more than two of $R_1$ to $R_4$ are independently selected from the group consisting of normal or branched chain alkyls having more than 3 and up to 6 carbon atoms which may include one or more ether links or ester branches, and wherein one or more carbons may be substituted by another atom;

Wherein at least one of $R_1$ to $R_4$, but no more than two, is an organic moiety containing 8 to 20 carbon atoms, which may include one or more ether links or ester branches, and wherein one or more carbon atoms may be substituted by heteroatoms, and wherein the chain can be broadly chosen from alkyls, alkenyls, aryls, arylalkyls, arylalkenyls, alkylaryls, and alkenylaryls; and Wherein no more than two of $R_1$ to $R_4$ are hydrogen or other organic moieties containing heteroatoms and ether links and ester branches.

The preferred compounds are ammonium (X is nitrogen) and phosphonium (X is phophorous) alkylated compounds. The preferred hydrate inhibiting compounds have one long chain of 12 to 16 carbon atoms or substituents in the backbone. A preferred substituent is oxygen, followed by sulfur and silicon.

The alkylated compounds can be chemically bound through any of the ligand groups ($R_1$ through $R_4$) to polymers. They then are branches of these polymers. Examples of polymers to which the alkylated compounds can be suitably bound are polyacrylic acid, and polymers and copolymers of N-vinyl-2-pyrrolidone.

The anions of the alkylated compounds can be broadly chosen. Preferred anions are the hydroxides, carboxylates, halides, sulfates and organic sulphonates.

In the case of the ammonium or phosphonium alkylated compounds having three alkyl groups, the fourth group attached to the nitrogen or phosphorus atom can vary broadly without significantly altering the hydrate growth inhibiting properties of these compounds, whereby additional advantages can be achieved by the fourth group. Examples of such fourth groups are long alkyl or alkenyl chains, in particular oleyl, or groups attached to polymers. Exemplary of such polymers wherein the subject compounds can be incorporated by their fourth group are polyacrylic acid, and the polymers and copolymers of N-vinyl-2-pyrrolidone.

When the fourth group $R_4$ of an alkylated compound is a longer alkyl or alkenyl chain (e.g. one containing more than 12 carbon atoms), its surface active properties may give the alkylated compound, in addition to its inherent hydrate crystal growth-inhibiting properties the capabilities of:

1. Emulsifying the aqueous into the hydrocarbon phase, thereby reducing the concentration of water available for hydrate forming at the conduit wall.
2. Concentrating the subject compound near the water-hydrocarbon interfaces, where hydrate formation is most pronounced, thereby raising the local concentration of ions to freezing-point depressing level.
3. Modifying the structure of water near the hydrocarbon-water interface in such a way that the formation of hydrate crystals is hindered.
4. Impeding further access of water molecules to the hydrate crystal after attachment of the alkylated compound to the hydrate crystals.
5. Preventing agglomeration of hydrate crystals by making their surface hydrophobic.
6. Adhering the alkylated compound to the conduit wall, thereby preventing the adhesion of hydrates thereto. All of these properties are advantageous.

It will be understood that the compounds used may be soluble in water and may partition into the liquid hydrocarbon phase, but would preferably be at the concentration required and at a temperature of about (−1)° Celsius and above at the water-hydrocarbon interface.

The alkylated compounds useful in the invention can be prepared in manners that are known in the art, from ingredients that are simple and abundantly available.

The alkylated compounds can be used together with the polymers and copolymers of N-vinyl-2-pyrrolidone, which is the subject of Patent No. WO9325798, incorporated by reference herein in the entirety, and the combined effect is at least additive. The latter are preferably added in an amount of between 0.05 and 5 wt %, based on the water content.

The hydrate inhibitor compounds to be recovered and reemployed may in the practice of the invention have been added to the mixture of low-boiling hydrocarbons and water as a dry powder, but preferably are added in concentrated solution, dissolved in a polar solvent other than water. Thus a second polar solvent is likely to be present on recovery of aqueous phase from the produced well fluids.

The present invention permits the formation of miscible, partially miscible, or immiscible solutions that can be forced to partition by the incorporation of additional ions. To accomplish this requires the presence of two or more polar solvents and a non-quaternary salt in the process fluids containing the hydrocarbons and hydrate inhibitor compound. Two or more polar solvents can be selected from water, alcohols, glycols, and polar organic solvents. In most instances water will be one of the polar solvents since it is often present in the process fluids.

Suitable alcohols generally contain less than five carbon atoms. Examples include, but are not limited to methanol, ethanol, isopropanol, sec-butanol, tert-butanol, etc.

Suitable glycols or diols contain up to six carbon atoms. Examples include, but are not limited to monoethylene glycol, diethylene glycol, and triethylene glycol.

A number of organic polar solvents are also suitable, such as, for example, acetone, methylethylketone, dimethylketone, acetates, and formates. In the practice of the present invention, suitable solvents may already be present in the flowing mixture of hydrocarbons and water in the conduit as a solvent for the quaternary salt injection or as a hydrate melting point depressant. The hydrate inhibitor can be dissolved in a suitable solvent and then introduced into the conduit. In many cases, a polar solvent type antifreeze has been introduced into the conduit to carry the quaternary salt in a pumpable form. It is desirable for the hydrate inhibitor to be dissolved into an organic solvent that also functions as a melting point depressant.

Where antifreeze is used it may be selected from alcohols, glycols, alkyl ketones, alkyl acetates, and other organic solvents. In the practice of the present invention it is preferred that the organic solvent double as an antifreeze, because that aids in hydrate control. Alkyl alcohols and alkyl glycols are both excellent solvents and also act as antifreezes in aqueous systems.

The organic solvent should be capable of carrying a sufficient quantity of hydrate growth inhibitor to minimize the quantity of solution that needs to be introduced into the conduit. Preferably, the organic solvent should be capable of carrying a sufficient quantity of the hydrate inhibitor so that the flow-rate for the added solution is an order of magnitude less than the flow-rate of the water phase in the conduit or an order of magnitude less than if the quaternary compound were absent.

A non-quaternary salt is a key part of the present invention. Suitable non-quaternary salts include salts of elements of Group IA, IIA, IIB, or VIII of the Periodic Table. The salts of these compounds can be in the form of chlorides, bromides, and iodides or other Group VIIA elements. Examples include the chlorides, bromides, or iodides of sodium, calcium, magnesium, potassium, zinc, and iron. The anions may also be selected from nitrates, nitrites, acetates, and thiocyanates. The metal halide salts are preferred due to their availability. The metal chloride salts are preferred in the present invention. The key to the present invention is the addition of sufficient inorganic salt to a solution, partially miscible solutions, or dispersions containing the two polar solvents, possibly a liquid hydrocarbon and the hydrate formation inhibitor to create a cloudy mixture which subsequently settles into two polar phases of differing polarity, possibly a liquid hydrocarbon phase, whereupon the inhibitor/modifier is forced into one phase and recovered.

In the present invention, more than one salt may be introduced into the separation process at the end of the conduit, and it is not necessary that the inorganic salt introduced into the conduit be chemically the same as the ions present in the produced aqueous phase of the well. When determining the amount of salt to be introduced, the weight percent of all of the non-quaternary salt ions present in the conduit should be taken into account to determine the amount of inorganic salt to be introduced. If there are already inorganic salts present in the conduit and associated piping, then the amount of inorganic salt to be introduced should be reduced by the amount of inorganic salt present.

In the practice of the present invention, for recovery at or near room temperatures, or less than 25 degrees Celsius, sufficient non-quaternary salt is introduced to cause the weight percent of all the non-quaternary salt ions within the aqueous phase of the conduit to be at least 4%, preferably at least 6%, and most preferably 4% to 12%.

It is possible to maintain the hydrate growth inhibitor within an aqueous phase or at the liquid hydrocarbon-water interface in the absence of a sufficiently large second polar solvent phase.

The quantity of the cationic surfactant type hydrate growth inhibitor introduced into the conduit is principally dependant upon the amount of water flowing in the conduit and, secondarily, on the pressure in the conduit and the lowest expected temperature in the conduit (typically a consideration with shut-ins). The amount of produced or introduced salt or introduced antifreeze solvent play a less critical role, though the presence of some inorganic salt has beneficial effects. Typically, the weight ratio of hydrate inhibitor to salt within the aqueous phase of the conduit should be from 0.01 to 0.30, preferably from 0.02 to 0.04. If a polar solvent antifreeze is used in carrying the hydrate inhibitor or inhibitor mixture to the well site, it is desirable to have the concentration of it as low as possible, consistent with hydraulic needs, in order to reduce costs and pumping rates.

The amount of hydrate inhibitor, inorganic salt, and antifreeze (if used) to be introduced into the conduit depends upon the amount of water produced in the conduit and associated piping systems during normal operations and shut-ins of the well and flowline system. It is desirable to introduce sufficient cationic surfactant type hydrate inhibitor to inhibit plugging of the conduit and associated piping systems. Typically, for 10 to 25 degrees Celsius subcooling, sufficient hydrate inhibitor is introduced to cause the weight percent of the hydrate inhibitor, based on water within the conduit to be at least 1.0%, preferably at least 0.75%, and most preferably 0.5%.

The present invention could be used in any well containing a flowing mixture of hydrocarbons and process fluids, but is particularly suitable for use in subsea wells situated at a distance from the host platform in very deep water where the temperatures are low (as low as −1 degrees Celsius) and the pressures are high (up to 90 Mpa). Implementation of the present invention, the recovery of the surfactant hydrate inhibitor, would take place at the point where the hydrocarbons are collected, e.g. at the end of the conduit, where the flowing mixture contains hydrocarbons, hydrate/water, a second polar solvent, possibly produced or injected salt, and the hydrate growth inhibitor component. An alcohol or glycol, which are also antifreezes, is often present as the second polar solvent, because they are useful in dissolving the cationic surfactant/hydrate inhibitor, which may originally be in powdered form. At the host facility, the hydrocarbons may be subjected to a separation system to separate water and to a system for cleaning oil from water. Although the present invention could be implemented in a number of ways, as will be apparent to those skilled in the art, it is believed the preferred point of implementation for the method of this invention for water soluble surfactants would be just before the oil-free water is released into the sea. At this point the water may contain hydrate inhibitor, along with a polar solvent and inorganic salt, mostly as NaCl. In situations where the produced water might not contain enough salt or second polar phase, salt and a second polar phase could be injected at the facility. If the field produces brine, that may suffice for the desired amount of inorganic salt.

In case of oil-partitioning ionic surfactants the preferred recovery of the surfactant is at the free-water-knockout, which is the first step in the separation process where an aqueous phase is separated from the produced fluids. The required inorganic salt and second polar phase would be injected just before the free-water-knockout equipment.

When the produced mixture arrives at processing or recovery facilities the hydrates are generally in crystal form, preferably dispersed in the aqueous phase. The crystals can be melted or dissociated by heat and reduced pressure.

At the recovery platform the phases are separated in the following four steps:

1. High pressure separation, typically at 6 to 15 Mpa. where high pressure gas is removed.
2. Intermediate pressure separation at 2 to 4 Mpa. where the intermediate gas is removed.
3. Free-water-knockout where the pressure is in the order of 0.5 Mpa, gas/liquid hydrocarbon/aqueous phases are separated. The inlet stream would have to be heated to above the hydrate decomposition temperature before entry if necessary.
4. Final water separation occurs in crude oil dehydration units, normally called chem-electrics, as they employ electrical fields and chemicals to reduce the amount of water in the hydrocarbon phase, which is removed. Some residual gas is separated there as well.

When the pressure is letdown, the hydrates dissociate if the stream is warm enough. At about 0.5 Mpa hydrates will dissolve or dissociate if the temperature is above about 4 degrees Celsius. Typically free-water-knockout process temperatures will be in excess of about 4 degrees Celsius to aid in water separation and release more gas and control the vapor pressure below acceptable limits for liquid hydrocarbon transport. This may require heaters or heat exchangers.

After the final 3-phase separation in the free water knock-out and chem-electric, the aqueous phase is prepared for overboard discharge by water cleaning or polishing processes. The EPA mandates that the amount of total oil and grease in the discharged waters be less than 29 ppm.

The deoiled and degreased water will still contain the cationic surfactant type hydrate inhibitor in an amount in the range of 0.5% wt basis water. Polar solvents may be present in an amount in the range of 2–5%. A salt is typically present in an amount in the range of a few percent.

The preferred placement of the present invention would be after the knock-out, chem-electrics, and deoiling procedures, but before the final water clean-up or polishing, before water discharge to the sea for water soluble surfactants. For oil partitioning surfactants the preferred placement of the present invention is at the free-water-knockouts.

At this point in the practice of the present invention, sufficient additional alcohol, such as methanol, isopropanol or butanol, is added to the produced aqueous phase to form a miscible, partially miscible solution or immiscible dispersion. Salt is then added to this solution, which then turns milky or cloudy, and subsequently forms two clear phases, water and alcohol based. When the two phases form, most of the salt enters the clear water phase and most of the hydrate inhibitor enters the clear alcohol phase. Different concentrations of alcohol and salt permit recovery of varying percentages of hydrate inhibitors. It is necessary to achieve a concentration of alcohol and salt sufficiently high that the solution becomes cloudy and settles into two phases, wherein the hydrate growth inhibitor/modifier is forced into the less polar phase.

In the method of the present invention temperature may be significant. Tests in the present invention were performed at room temperature, however an increase or decrease in temperature may make a significant difference, as will be appreciated by those skilled in the art. For example, secondary butanol/water solutions in certain compositions, may be single phase at 37° C. but may split readily into two phases by lowering the temperature over 5 degrees centigrade to 32° C.

As the phase separation is not instantaneous, a means of separating the phases would be indicated. This could be accomplished by means of a settling tank, but settling tanks act slowly, and are large and heavy when filled with water, qualities undesirable on offshore platforms. Another effective means of separation would be a cyclone separator or centrifugal separator.

In the present invention the phase containing the recovered hydrate inhibitor for example, alcohol, is recovered and can be recycled to the producing well after adding makeup ionic surfactant of the type described.

DETAILED DESCRIPTION OF THE DRAWING

Referring to the drawing, the Production System comprises a well, a wellhead with associated controls and safety devices, as well as a flowline to a host structure where the produced fluids are separated and cleaned for sale. The Separation System recovers natural gas from the fluids in a series of separators starting from high pressure, going to intermediate pressure and ending up with low pressure separation, usually at less than 0.5 Mpa, usually in free-water-knockouts and chem-electric crude oil dehydration units. The gases are withdrawn, cleaned and compressed by systems not relevant to the present invention. The last phase of gas separation usually also separates water from liquid hydrocarbons, oil or condensate.

In the presence of surfactant type hydrate growth inhibitors the produced stream will contain at least some solid hydrate particles. Efficient solid/liquid separation is difficult. Hence it is envisioned that the produced stream will be induced to melt the solid hydrates by reducing pressure as well as possible heating. If required, the heat addition can be achieved at any location in the treating process. The preferred location is just prior to the low pressure free-water-knockout separator. This creates the aqueous phase just before it is needed, avoids heating the gas (which places large demands on dehydration of gas), and gets by with the lowest level of heating as the hydrate dissociation temperature at this point is minimal.

In the case of water soluble surfactant hydrate inhibitors the low pressure separators discharge two liquid streams, one essentially oil, the other water and suspended and water soluble components. The oil phase is polished in equipment, the chem-electrics, which also discharge additional water. The combined waters from the free water knockouts and chem-electrics contain some entrained oil or condensate. This oil is recovered in water cleaning equipment such as corrugated plate interceptors, gas flotation devices, or cyclones. Dissolved solids are still retained, especially dissolved hydrate growth inhibitors.

In the case of hydrocarbon partitioning hydrate inhibitor surfactants the polar (water, alcohols, salts, etc) non-polar (hydrocarbon) separation would have to be induced by the proper introduction of the polar solvent and inorganic salt prior to the free-water-knockout.

In the present invention the cleaned water or produced, degassed stream is mixed with a selected polar solvent and with selected inorganic salts so as to force a phase separation of water and the selected polar solvent and its associated ionic surfactants. It is noted that organic salts might not be as useful in this capacity, because organic ions often have the opposite effect, i.e. they "salt-in", or increase the solubility of organic structures in the water-rich phase.

The mixing is achieved by injection into a flowing stream which then passes through a static mixer, then enters a mixing and settling tank where the phases separate. The lower phase consists of mostly water with inorganic salts as well as selected organic salts. The upper phase consists of the polar solvent plus the quaternary ammonium, phosphonium, or sulphonium salt, the two polar phases may be below a liquid hydrocarbon phase.

The upper polar phase is pumped through a cyclone for polishing and this phase is stored in a shipping tank, where it also can be mixed with make-up ionic surfactants.

The following examples will serve to illustrate specific embodiments of the invention disclosed herein. These examples are intended only as a means of illustration and should not be construed as limiting the scope of the invention in any way. Those skilled in the art will recognize many variations that may be made without departing from the spirit of the disclosed invention.

EXAMPLE 1

2.04 grams of hexadecyltributylphosphonium bromide, hence called quaternary salt or more simply, quat, was added to a solvent blend consisting of 96.0 ml of water plus 4.0 ml of isopropanol at room temperature. The three compounds were miscible, providing a single, clear phase. A blend of sodium and calcium chlorides (70% NaCl, 30% $CaCl_2$) was added to the previous mixture with results as listed in Table 1:

TABLE 1

Mixed Sodium/Calcium Salt Effects on Dissolved Quaternary Salts

| $NaCl/CaCl_2$ Concentration | Initial Phase Appearance | Number of Final Phases |
|---|---|---|
| 1.94 gm | Clear | 1 |
| 3.99 gm | Clear | 1 |
| 6.29 gm | Cloudy | 2 |

Addition of approximately 6% normal salt to the ionic surfactant/water/isopropanol created an initially cloudy mixture which settled out into two clear phases. The top phase appeared to be principally isopropanol and contained dissolved solids at a level of 1.53 grams. The solids were principally ionic surfactant quaternary salts indicating that the procedure recovered approximately 75% of the original quats. Most of the inorganic salt remained in the aqueous phase.

EXAMPLE 2

The lower phase from Example 1 above, measuring about 96 milliliters, is separated from the upper phase which contained 75% of the quaternary salt and contacted with an aliquot of isoproponal measuring 4.2 milliliters, and contacted for 5 minutes and allowed to settle for 5 minutes into two phases under the influence of gravity or augmented gravity for a period of 10 minutes. The isopropanol (IPA) rich phase increases to 4.9 milliliters. Analysis for phophorous content by flame ionization detection indicates that the IPA phase contains 0.45 grams of quaternary inhibitor. The example clearly shows that a second extraction step would raise the recovery of the quarternary compound to over 96%.

EXAMPLE 3

A solution is prepared which contains the following constituents: 1.6 grams of hexadecyltributylphophonium bromide, 3.1 grams of IPA, 1.2 grams of NaCl and 3 grams of $CaCl_2$, all dissolved in 96 grams of water. To this solution is added 4 grams of a salt mixture of sodium and calcium chlorides and 2 grams of IPA. The mixture is contacted for 5 minutes and allowed to settle into two phases. Phosphorus determination of the IPA-rich phase shows that it contains 1.4 grams of the inhibitor, resulting in an 87% recovery. A second extraction with IPA raises the recovery of the quaternary compound to 98%.

EXAMPLE 4

A clear solution is made by dissolving 1 gram of the same quaternary phophonium compound used in Examples 1 through 3 in 4.5 grams of sec-butanol and 95 grams of water containing 4 grams of sodium chloride. To this solution, 4 grams of a 50w/50w mixture of NaCl/CaCl$_2$ is added. Upon mixing the added salt dissolves and a second phase appears which consists essentially of sec-butanol and quaternary compound along with small amounts of water. Upon separation, weighing and flame ionization detection, it is estimated that the sec-butanol upper phase contains 0.7 grams, indicating a 70% recovery of the surfactant. Upon contacting the aqueous phase with an additional aliquot of 2 grams of sec-butanol, an additional 0.27 grams of the quaternary compound is extracted, raising the recovery to about 97%.

EXAMPLE 5

Two solutions are made as follows:
Solution A is made by dissolving 1.0 gram of a quaternary ammonium salt in which $R_1$ and $R_2$ are sec-butyl groups, whereas $R_3$ and $R_4$ are mono-unsaturated chains with 8 to 12 carbon atoms, into 4.1 grams of triethylene glycol (TEG).
Solution B is made by dissolving a 50/50 by wt. mixture of NaCl and CaCl$_2$ mixture into 140 grams of water.

Solutions A and B are mixed together to form a clear solution, C, by shaking for two minutes. This solution phase is representative of the aqueous phase which would result as the oil-free aqueous phase from a gas or oil well. To solution C a 2-gram aliquot of TEG is added and it also dissolves completely. Into the resulting mixture another 6.2 grams of a 50/50 NaCl/CaCl$_2$ mixture is added. The solution then turns cloudy. Upon shaking for 3 minutes and allowing to settle for 10 minutes two clear phases result; a water-rich lower phase which contains the majority of the inorganic salts and a TEG-rich upper phase. The upper phase weighs 7.1 grams and elemental analysis for nitrogen indicates that it contains 89% of the quaternary salt. The upper phase also contains about 0.6 grams of water. This example illustrates that the procedure can be used effectively to recover quaternary salts with two long chains and that TEE can also be used as an extractant of the quaternary salts.

What is claimed is:
1. A method for separating and recovering a dissolved surfactant comprising a hydrate growth inhibitor and/or modifier from a substance containing water as an aqueous polar solvent, which comprises:
   adding a second polar solvent that is nonaqueous and a salt which modifies the ionic strength of said aqueous and said second polar solvents resulting in two separate polar solvent phases, wherein said dissolved ionic surfactant principally partitions into a second polar phase and said salt partitions principally into an aqueous phase;
   wherein the dissolved surfactant is selected from the group consisting of water soluble ionic surfactants and hydrocarbon partitioning, but water-hydrocarbon interface preferring, ionic surfactants; and
   wherein the substance containing water is selected from the group consisting of aqueous solutions, water/hydrocarbon dispersions, and water/hydrocarbon emulsions.

2. The method of claim 1 wherein said surfactants are selected from single and polymeric surfactants.

3. The method of claim 2 wherein the single or polymeric ionic surfactant is cationic.

4. The method of claim 3 wherein the cationic surfactants are selected from salts of long chain fatty amines and quaternary ammonium, phosphonium, or ternary sulphonium salts.

5. The method of claim 4 wherein the cationic surfactants can be represented by the structure:

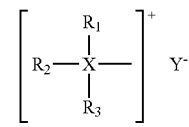

Wherein X is chosen from S, N—$R_4$, P—$R_4$ and S, N, P are sulfur, nitrogen, phosphorous, respectively;
Wherein plus represents cations and minus denotes anions;
Wherein Y is selected from bromide, chloride, iodide, fluoride;
Wherein no more than two of $R_1$ to $R_4$ are independently selected from the group consisting of normal or branched chain alkyls having more than 3 and up to 6 carbon atoms which may include one or more ether links or ester branches, and wherein one or more carbons may be substituted by another atom;
Wherein at least one of $R_1$ to $R_4$ but no more than two, is an organic moiety containing 8 to 20 carbon atoms, which may include one or more ether links or ester branches and wherein one or more carbon atoms may be substituted by heteroatoms and where the chain can be broadly chosen from alkyls, alkenyls, aryls, arylalkyls, arylalkenyls, alkylaryls, and alkenylaryls; and
Wherein no more than two of $R_1$ to $R_4$, are hydrogen or other organic moiety containing heteroatoms and ether links and ester branches.

6. The method of claim 5 wherein in the cationic surfactant comprises a quaternary alkylated compound comprising at least three alkyl groups.

7. The method of claim 6 further comprising the fourth group being bonded to a polymeric backbone.

8. The method of claim 7 wherein the polymeric backbone is selected from polyacrylic acid, polymers and copolymers of N-vinyl-2-pyrrolidone.

9. The method of claim 3 wherein the the substance selected from aqueous solutions, water/hydrocarbon dispersions and water/hydrocarbon emulsions comprises process fluids from hydrocarbon production wells.

10. The method of claim 9 wherein the produced fluids comprise an aqueous flowing mixture comprising an amount of hydrocarbons, other gases, and an amount of production water wherein the amount and type of hydrocarbons, other gases, and water are sufficient to form hydrates at conduit temperatures and pressures.

11. The method of claim 10 further comprising the hydrate inhibiting/modifying ionic surfactant being recovered at a hydrocarbon production separation facility.

12. The method of claim 11 further comprising the hydrate inhibiting/modifying ionic surfactant is being recovered at the low presure end of hydrocarbon production separation facilities at the end of flow lines in one or more steps.

13. The method of claim 12 further comprising the recovered hydrate inhibiting/modifying compound is recycled after separation.

14. The method of claim 13 further comprising an addition of makeup compounds, surfactants/polar solvents—salts prior to recycling to wellheads.

15. The method of claim 9 wherein the amount of hydrate inhibitor in the process fluids is from about 0.05 to 5.00 percent by weight based on production water present.

16. The method of claim 15 wherein the amount of hydrate inhibitor in the process fluids is from about 0.1 to 1.0 percent by weight based on production water.

17. The method of claim 16 wherein the amount of polar solvents in the process fluids is in the range of 0 to 30 percent by weight based on production water.

18. The method of claim 9 further comprising the hydrate compound inhibitor having been dissolved in at least one polar solvent to facilitate injection into the produced stream.

19. The method of claim 18 further comprising at least one polar solvent comprising an antifreeze in terms of reducing the temperature at which hydrates begin to form.

20. The method of claim 18 wherein the polar solvent functions as both a solvent for a hydrate compound inhibitor and an antifreeze.

21. The method of claim 18 further comprising at least one polar solvent capable of extracting hydrocarbon partitioning ionic surfactants, singly or bound to polymeric backbones, from the water/hydrocarbon mixture.

22. The method of claim 1 wherein the added nonaqueous polar solvent is selected from water miscible, partially miscible in water, and water immiscible polar solvents.

23. The method of claim 22 wherein the nonaqueous polar solvent is a light alcohol having less than 6 carbons.

24. The method of claim 23 wherein the alcohol is selected from a group including methanol, ethanol, isopropanol, branched isobutanols, secondary butanol, and tertiary-butanol.

25. The method of claim 1 wherein the nonaqueous solvent is a light diol or glycol with less than 6 carbons.

26. The method of claim 1 wherein the nonaqueous solvent is a glycol selected from the group consisting of monoethylene glycol, diethylene glycol, triethylene glycol.

27. The method of claim 1 wherein the second polar solvent is selected from acetone, methylethylketone, acetate esters, and formate esters.

28. The method of claim 1 wherein the salt is inorganic salt and is selected from salts of elements of Group IA, IIA, IIB, or VIII of the Periodic Table.

29. The method of claim 28 wherein the salt is selected from chlorides, bromides, or iodides of sodium, calcium, magnesium, potassium, zinc, and iron.

30. The method of claim 29 wherein the salt is selected from nitrates, nitrites, and thiocyanates.

* * * * *